United States Patent [19]

Smous

[11] Patent Number: 5,432,878
[45] Date of Patent: Jul. 11, 1995

[54] SILICON CARRIER FOR TESTING AND ALIGNMENT OF OPTOELECTRONIC DEVICES AND METHOD OF ASSEMBLING SAME

[75] Inventor: James E. Smous, South Bend, Ind.

[73] Assignee: CTS Corporation, Elkhart, Ind.

[21] Appl. No.: 205,673

[22] Filed: Mar. 3, 1994

[51] Int. Cl.⁶ .............................................. G02B 6/42
[52] U.S. Cl. ......................................... 385/52; 385/14; 385/129; 385/131; 385/90; 385/92
[58] Field of Search ........................ 385/14, 15, 27, 31, 385/39, 49, 50, 51, 52, 88, 89, 90, 91, 92, 129, 130, 131, 132

[56] References Cited

U.S. PATENT DOCUMENTS

| | | | |
|---|---|---|---|
| 4,327,963 | 5/1982 | Khoe et al. | 385/35 X |
| 4,768,199 | 8/1988 | Heinen et al. | 372/36 X |
| 4,779,946 | 10/1988 | Pimpinella et al. | 385/88 |
| 4,966,430 | 10/1990 | Weidel | 385/14 X |
| 5,028,111 | 7/1991 | Yumoto et al. | 385/51 X |
| 5,029,968 | 7/1991 | Geiser, Jr. et al. | 385/51 X |
| 5,039,194 | 8/1991 | Block et al. | 385/88 |
| 5,113,466 | 5/1992 | Acarlar et al. | 385/88 |
| 5,123,066 | 6/1992 | Acarlar | 385/14 |
| 5,163,113 | 11/1992 | Melman | 385/31 |
| 5,181,216 | 1/1993 | Ackerman et al. | 372/36 |
| 5,182,782 | 1/1993 | Tabasky et al. | 385/89 |
| 5,222,175 | 6/1993 | Tatoh | 385/93 |
| 5,243,671 | 7/1993 | Koteles et al. | 385/31 X |
| 5,247,597 | 9/1993 | Blacha et al. | 385/88 X |
| 5,257,332 | 10/1993 | Pimpinella | 385/59 X |
| 5,295,214 | 3/1994 | Card et al. | 385/92 |
| 5,297,218 | 3/1994 | Hanaoka | 385/52 |
| 5,319,725 | 6/1994 | Buchmann et al. | 385/14 |
| 5,325,454 | 6/1994 | Rittle et al. | 385/76 |
| 5,337,392 | 8/1994 | Mousseaux et al. | 385/90 |
| 5,345,524 | 9/1994 | Lebby et al. | 385/88 |

Primary Examiner—Brian Healy
Attorney, Agent, or Firm—Albert W. Watkins

[57] ABSTRACT

An optoelectronic subassembly is illustrated which ensures the alignment of multiple optoelectronic devices without special assembly process. The optoelectronic devices are mounted upon specially designed sub-carriers which may be used to test the devices prior to completing the subassembly. The subassembly improves yields of complex optoelectronic systems and lowers resultant production costs.

2 Claims, 2 Drawing Sheets

SILICON CARRIER FOR TESTING AND ALIGNMENT OF OPTOELECTRONIC DEVICES AND METHOD OF ASSEMBLING SAME

BACKGROUND OF THE INVENTION

1. Field of the Invention

The invention pertains to optoelectronics generally, and more specifically to an apparatus optimized for both optoelectronic component testing and subsequent assembly to close tolerance.

2. Description of the Related Art

Optoelectronic devices offer much potential advantage over their purely electrical counterparts in speed of operations and in immunity to external interference. However, one obstacle which has prevented widespread use is the relative difficulty in making a high quality optical interconnection as opposed to the simplicity of the modern electrical connectors. Connections are generally made using lenses and fibers. The lenses and fibers are typically placed and aligned by robotic systems to attain the necessary precision.

The mechanical alignment of the prior art is not a process amenable to high volume, low cost production techniques. Recently, several disclosures have suggested that silicon may be used as a substrate material upon which the optoelectronic components and waveguides may be placed. By anisotropically etching the silicon, or with other well-known techniques from the semiconductor industry, v-grooves may be formed into the silicon with great precision. These v-grooves are used in the prior art to assist in the placement and alignment of optical fibers to optoelectronic components, the formation of optical waveguide to optical waveguide interconnection, and similar applications. While these uses of the silicon technology are valuable for the intended applications, the prior art fails to address the issues associated with device yield.

Optical devices are often expensive. Additionally, these devices suffer from yield problems that may go undetected until after final assembly and burn-in. While this problem exists with silicon integrated circuits used for purely electronic applications, the cost of re-working an optoelectronic component is generally much greater. The component must be removed from an aligned location, a new component placed with great precision, and the new component attached without subsequent movement or repositioning of neighboring devices. All processes must be completed without contamination or destruction of neighboring optical components.

Where there are a number of components which must all be aligned together, the failure of one of these components can add very greatly to the cost of assembly. Further, the chances for successful rework are diminished in view of the risk of contamination or disruption of alignment. Yet the likelihood of rework is greater with more optoelectronic components. The combination of higher cost to rework, lower expected yields, and lower rework yields result in exponentially increasing costs as more optoelectronic devices are combined in close proximity.

SUMMARY OF THE INVENTION

A carrier having alignment rails formed thereon engages multiple sub-carriers, each in precise alignment. The sub-carriers are movable relative to each other only within very minute tolerance ranges to allow for high quality optical interconnection without special tools or elevated costs. The sub-carriers further provide electrical contact points for burning in the individual optoelectronic components prior to the final assembly step.

OBJECTS OF THE INVENTION

A primary object of this invention is precise alignment of a number of optical components without the need for robotic systems. Another object of this invention is improved ability to rework an assembly of multiple optoelectronic devices. A further object of the invention is the mounting, burn in and testing of optoelectronic devices prior to co-assembly. Another object of the invention is production of an optoelectronic assembly which includes an optical waveguide and which may be further mounted and connected to other electrical and optical devices and substrates. These and other objectives are achieved through the use of a carrier and sub-carriers as exemplified in the description of the preferred embodiment and claimed in the appended claims.

DESCRIPTION OF THE PREFERRED EMBODIMENT

Figure 1:
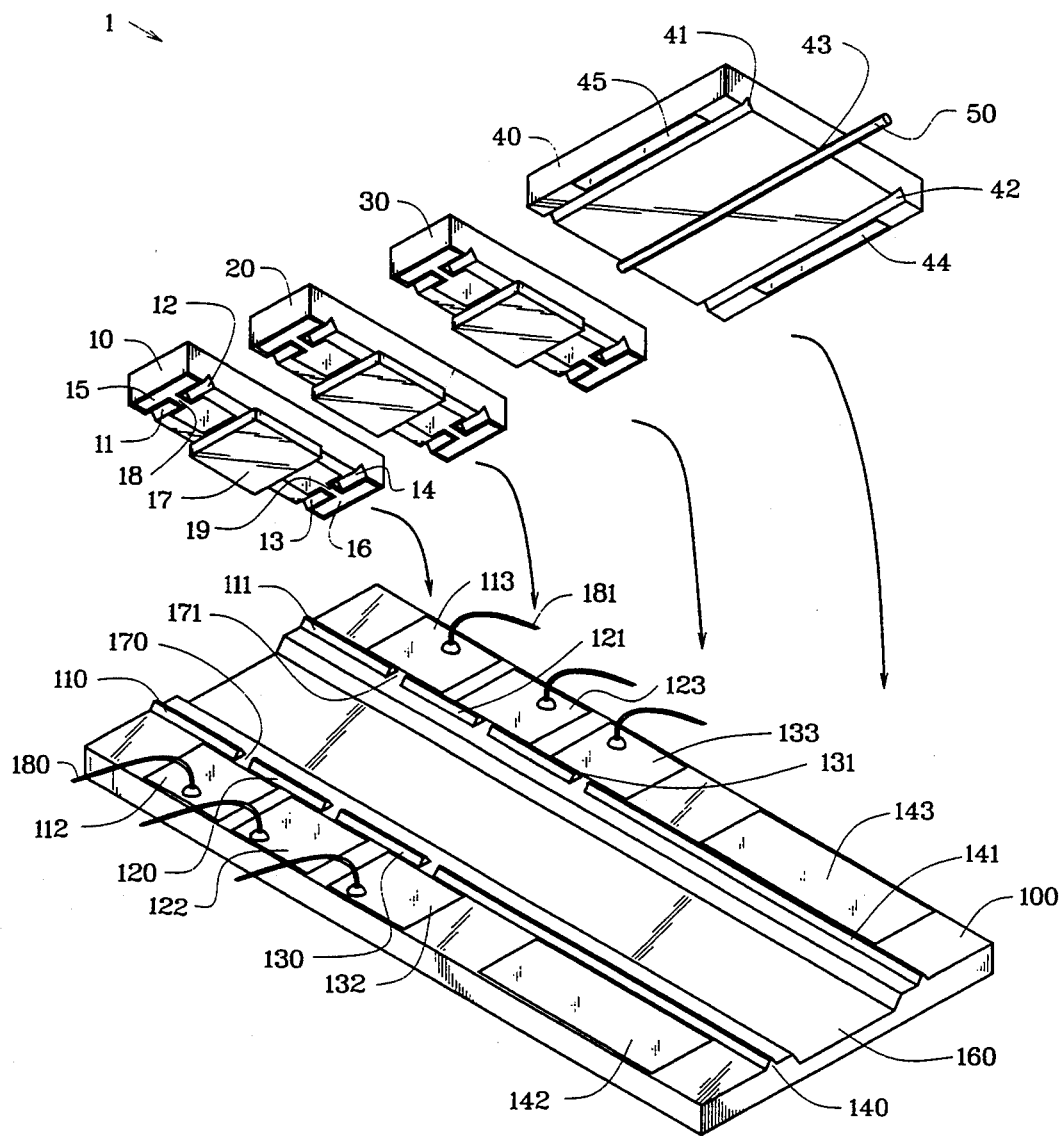
FIG. 1 illustrates an exploded view of an optical assembly designed in accord with the present invention.
Figure 2:
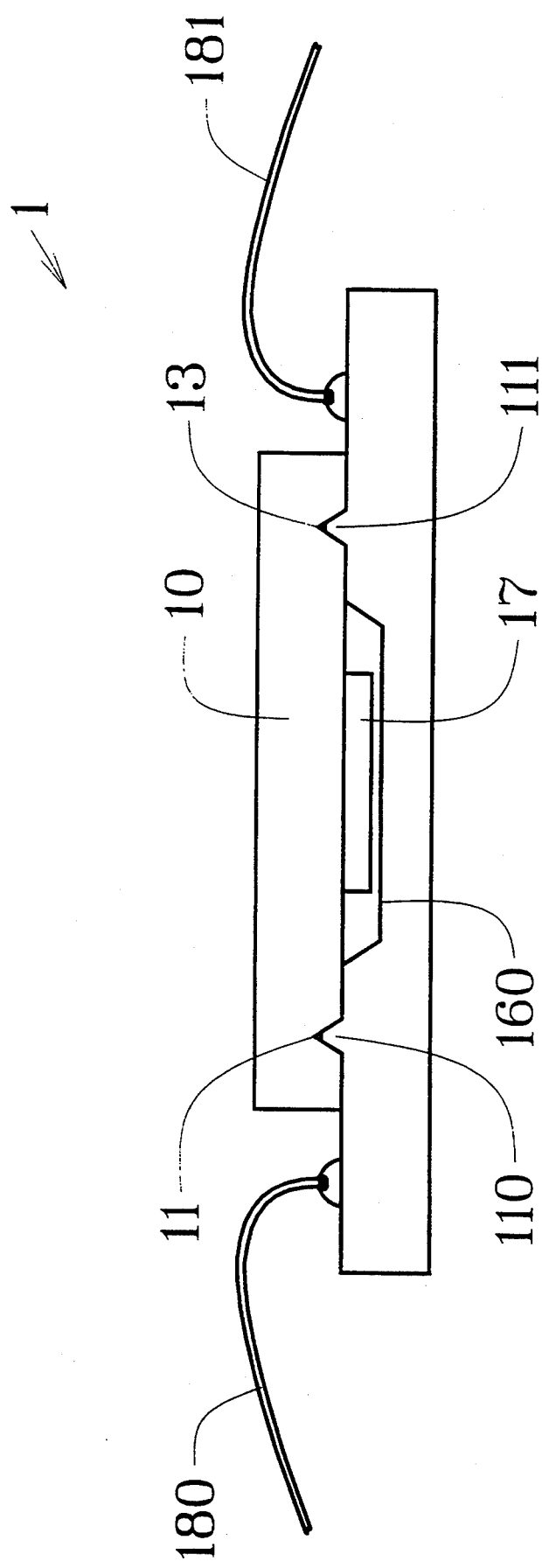
FIG. 2 illustrates an assembled end view of the assembly, taken from the end opposite the optical fiber of FIG. 1.

FIG. 1 illustrates by exploded view an exemplary, preferred embodiment of the invention, while FIG. 2 illustrates the fully assembled preferred embodiment from an end view. All numerals refer directly to those two figures, it being understood that these two figures are enabling, but the invention is not so limited.

An optical subassembly 1 includes a carrier substrate 100 and four sub-carriers 10, 20, 30 and 40. While there are four illustrated, it will be readily apparent that any multiple of carriers may be used, depending upon the requirements of the application. The carrier 100 and sub-carriers 10, 20 30 and 40 are all preferably manufactured from silicon which has been anisotropically etched to form the illustrated geometries. While other materials may be used, silicon is preferred for the good thermal expansion match with optoelectronic components, high thermal conductivity, availability and well established micro-machining.

For the purposes of this preferred embodiment, sub-carriers 10, 20 and 30 are illustrated as identical components, although it will be apparent after review of this disclosure that there is no such requirement. However, in order to simplify the description, these components will be considered to be duplicates. A description will therefore be provided in detail regarding sub-carrier 10. It is then understood that this description applies equally to all three identically illustrated sub-carriers.

Sub-carrier 10 has formed therein several "v" shaped grooves 11, 12, 13 and 14. These are alignment grooves, and so must be formed with some precision. Known anisotropic etching processes, or other suitable processes, may be used to form these grooves into subcarrier 10. Electrodes 15 and 16 extend from opposite edges of sub-carrier 10, but co-planarly. Electrodes 15 and 16 pass through a small, un-etched region between alignment grooves 11–14, identified at 18 and 19 respectively. The purpose of these features will be described in more detail hereinbelow. Sub-carrier 40 will typically be similarly formed in a way similar to the remaining sub-carriers, and includes therein three "v" shaped grooves 41–43. These grooves extend a full length of subcarrier 40, and are etched into a common surface thereon. Upon the same surface are two metallized areas 44 and 45.

These substrates are all designed to engage carrier substrate 100. Carrier 100 may also be manufactured from silicon, using the wellknown micro-machining processes. Carrier 100 includes thereon "v" shaped protrusions 110, 111, 120, 121, 130, 131, 140 and 141. Additionally there are metallized pads 112, 113, 122, 123, 132, 133, 142 and 143. An additional large channel 160 is provided relatively centrally in carrier 100.

Upon assembly, groove 11 will engage with protrusion 110, while groove 13 will engage protrusion 111, as is best illustrated in FIG. 2. Region 18 will. nest in small gap 170, while region 19 will nest in small gap 171. The engaging of grooves 11–14 with protrusions 110 and 111 ensures precise alignment of sub-carrier 10 with carrier 100 in a first axis. The nesting of regions 18 and 19 in gaps 170 and 171 ensures alignment in a second perpendicular axis. Alignment in the third perpendicular axis is ensured by the mating of electrodes 15 and 16 with metallized pads 112 and 113. Electrodes 15 and 16 are, in the preferred embodiment, attached to metallized pads 112 and 113 by solder. Alternatively, the interconnection may be through an epoxy such as a silver filled electrically conductive variety as known in the electronics industry.

Optical fiber 50 will be bonded to sub-carrier 40, and may be retained through the use of a braze, solder, epoxy or other known adhesive agent. While fiber 50 is illustrated as a single optical fiber, there is no restriction upon the invention, it being clear that this may be a mono-mode fiber, a multiple fiber bundle, a non-fiber waveguide, or other optical component. However, a cylindrical fiber offers advantage from the standpoint of precision in alignment within the "v" shaped groove 43. Grooves 41 and 42 mate with protrusions 140 and 141 to retain sub-carrier 40 in one axis. A first perpendicular axis of retainment is achieved with pads 142 and 143. While these pads are illustrated as metallized pads, there is no functional requirement for this, since no electrical interconnection must be made therethrough. However, rather than require two distinct processes at the time of assembly, metallizations and solder attachment are preferred for attachment of this sub-carrier also.

The assembly process begins with the formation of each sub-carrier and carrier 100. As described, in the preferred embodiment this is achieved through the anisotropic etching of silicon. Thereafter, the sub-carriers and carrier 100 are metallized. The optoelectronic devices, such as 17 shown on sub-carrier 10, are mounted. Each sub-carrier then may be tested individually, even including any required burn-in procedures. Where necessary, a test fixture similar to carrier 100 may be designed with test components and any necessary sub-carriers already mounted to facilitate the testing process. The individual sub-carrier 10 may then be performance verified prior to final assembly.

After any appropriate testing, solder paste may be deposited upon all metallized areas including pads and electrodes. The sub-carriers are then placed with the optoelectronic devices such as 17 into groove 160 of carrier 100, with the alignment grooves and protrusions mating. Sub-carrier 40 may then be gently slid along the axis of protrusions 140 and 141 towards sub-carrier 30, so as to ensure tight physical engagement between each sub-carrier substrate. Gaps 170 and 171 may be designed either to limit any movement along the axis of protrusion 140, or, conversely, allow sufficient movement to ensure tight coupling therebetween while still maintaining the sub-carriers upon carrier 100. In the preferred embodiment, there is sufficient play in the direction of the axis of protrusion 140 to ensure tight coupling. The surface of the sub-carriers 10, 20, 30 and 40 opposite carrier 100 may have a slight pressure applied thereto, typically with a compliant material, so as to ensure good mechanical contact between the sub-carriers and carrier 100. Where solder paste was used, the solder may be thermally or laser reflowed, and in the case of the epoxy, the epoxy may be cured.

The optoelectronic sub-assembly 1 is then ready for electrical and/or mechanical interconnection with various other optical and electronic components. Wire bonds 180 and 181 are illustrated as one example of such further packaging as may be deemed appropriate by one of ordinary skill.

While the foregoing details what is felt to be the preferred embodiment of the invention, no material limitations to the scope of the claimed invention is intended. Further, features and design alternatives that would be obvious to one of ordinary skill in the art are considered to be incorporated herein. The scope of the invention is set forth and particularly described in the claims hereinbelow.

I claim:

1. An optoelectronic subassembly comprising:
    a sub-carrier means for supporting thereon an optoelectronic device, said sub-carrier means having a first physical alignment means and a second electrical interconnection means;
    a means for transmitting an optical signal through a restricted path;
    a carrier means for supporting thereon said sub-carrier means and said transmitting means, said carrier means having a second physical alignment means and a second electrical interconnection means;
    said first physical alignment means engaged with said second physical alignment means and thereby aligning said transmitting means with said optoelectronic device.

2. A method for assembling an optical sub-assembly, comprising the steps of:
    forming a carrier having carrier alignment means;
    forming an optoelectronic device sub-carrier having sub-carrier alignment means;
    forming a waveguide sub-carrier having waveguide sub-carrier alignment means and waveguide alignment means;
    mounting an optoelectronic device upon said optoelectronic device sub-carrier;
    testing said optoelectronic device upon said optoelectronic device sub-carrier;
    engaging said tested optoelectronic device sub-carrier with said carrier; and
    engaging said waveguide sub-carrier with said carrier, said waveguide sub-carrier and said optoelectronic device sub-carrier being in precise optical alignment.

* * * * *